(12) United States Patent
Bora et al.

(10) Patent No.: US 12,384,254 B2
(45) Date of Patent: Aug. 12, 2025

(54) METHOD FOR CONTROLLING A ROTATIONAL SPEED OF AN OUTPUT SHAFT OF A PROPULSION UNIT

(71) Applicant: VOLVO TRUCK CORPORATION, Gothenburg (SE)

(72) Inventors: Teodoro Bora, Gothenburg (SE); Hans Bernler, Mölndal (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 379 days.

(21) Appl. No.: 17/938,144

(22) Filed: Oct. 5, 2022

(65) Prior Publication Data
US 2023/0105929 A1 Apr. 6, 2023

(30) Foreign Application Priority Data

Oct. 6, 2021 (EP) .................................. 21201095

(51) Int. Cl.
*B60L 15/20* (2006.01)

(52) U.S. Cl.
CPC ........... *B60L 15/20* (2013.01); *B60L 2240/12* (2013.01); *B60L 2240/14* (2013.01); *B60L 2240/421* (2013.01); *B60L 2240/423* (2013.01)

(58) Field of Classification Search
CPC .. B60L 15/20; B60L 2240/12; B60L 2240/14; B60L 2240/421; B60L 2240/423;
(Continued)

(56) References Cited

U.S. PATENT DOCUMENTS

| 6,112,719 A * | 9/2000 | Earleson | F02D 31/001 |
| | | | 123/352 |
| 7,788,018 B2 | 8/2010 | Speetzen et al. | |

(Continued)

FOREIGN PATENT DOCUMENTS

| DE | 102017005860 A1 | 12/2017 |
| EP | 2851254 A1 | 3/2015 |

(Continued)

OTHER PUBLICATIONS

Extended European Search Report in corresponding European Application No. 21201095.3 dated Apr. 4, 2022 (8 pages).

*Primary Examiner* — Aniss Chad
*Assistant Examiner* — Nikki Marie M Molina
(74) *Attorney, Agent, or Firm* — Venable LLP; Jeffri A. Kaminski (57) ABSTRACT

A method for controlling a rotational speed of an output shaft of a propulsion unit. The method includes determining a speed setpoint value, indicative of a rotational speed setpoint for the output shaft, and an actual speed value, indicative of an actual rotational speed of the output shaft, determining an acceleration value using an acceleration value determination procedure comprising employing an acceleration conversion function that uses the speed setpoint value, the actual speed value and an acceleration setting member as inputs and which produces a resulting value to be used for determining the acceleration value, determining a torque request value using a torque conversion operation that uses the acceleration value, and controlling the propulsion unit using the torque request value.

18 Claims, 5 Drawing Sheets

(58) Field of Classification Search
CPC ....... F02D 2041/141; F02D 2041/1422; F02D 2200/10; F02D 2200/1012; F02D 2200/604; F02D 2250/18; F02D 2250/24; F02D 2250/26; F02D 31/001
See application file for complete search history.

(56) References Cited

U.S. PATENT DOCUMENTS

| | | | |
|---|---|---|---|
| 2003/0034006 A1* | 2/2003 | Richard | F02D 31/001 123/352 |
| 2007/0238576 A1* | 10/2007 | Muetzel | F02D 31/009 123/352 |
| 2015/0149060 A1* | 5/2015 | Baur | B60W 10/06 701/102 |
| 2015/0293543 A1* | 10/2015 | Maier-Landgrebe | B60W 20/00 700/275 |
| 2022/0258617 A1* | 8/2022 | Komatsu | B60L 3/0076 |

FOREIGN PATENT DOCUMENTS

| | | |
|---|---|---|
| WO | 0036475 A1 | 6/2000 |
| WO | 2019207542 A1 | 10/2019 |

* cited by examiner

METHOD FOR CONTROLLING A ROTATIONAL SPEED OF AN OUTPUT SHAFT OF A PROPULSION UNIT

TECHNICAL FIELD

The present invention relates to a method for controlling a rotational speed of an output shaft of a propulsion unit. Moreover, the present invention relates to a control unit for controlling a rotational speed of an output shaft of a propulsion unit. Furthermore, the present invention relates to a propulsion assembly. Additionally, the present invention relates to a vehicle.

The invention can be applied in heavy-duty vehicles, such as trucks, buses and construction equipment. Although the invention will be described with respect to a truck, the invention is not restricted to this particular vehicle, but may also be used in other vehicles such as working machines or seagoing vessels such as boats. Moreover, the present invention may be used in stationary power generators and the like.

BACKGROUND

When controlling a rotational speed of an output shaft of a propulsion unit, it is generally desired to ensure that the rotational speed meets a speed setpoint value. Purely by way of example, the speed setpoint value may be set by an operator of the propulsion unit or the speed setpoint value may be set by a control assembly or similar equipment.

In order to ensure appropriate rotational speed control, U.S. Pat. No. 7,788,018 B2 discloses a method for controlling an internal combustion engine having a common rail system together with individual accumulators. A rotational speed-control deviation is determined from a target rotational speed that represents the set point for an outer control loop to control the rotational speed, as well as from an actual rotational speed. A target torque is determined from the rotational speed-control deviation via a rotational speed controller as a master controller.

Although the method according to U.S. Pat. No. 7,788,018 B2 may be useful under certain operating conditions, there may still be a need for further improving the control of a rotational speed of an output shaft of a propulsion unit.

SUMMARY

In view of the above, an object of the invention is to enable that a rotational speed of an output shaft of a propulsion unit can be controlled in an appropriate manner.

As such, the first aspect of the present invention relates to a method for controlling a rotational speed of an output shaft of a propulsion unit. The method comprises:

determining a speed setpoint value, indicative of a rotational speed setpoint for the output shaft, and an actual speed value, indicative of an actual rotational speed of the output shaft, determining an acceleration value using an acceleration value determination procedure comprising employing an acceleration conversion function that uses the speed setpoint value, the actual speed value and an acceleration setting member as inputs and which produces a resulting value to be used for determining the acceleration value, the acceleration conversion function being such that different resulting values can be obtained for a same set of the speed setpoint value and the actual speed value but for different choices of the acceleration setting member, determining a torque request value using a torque conversion operation that uses the acceleration value, and controlling the propulsion unit using the torque request value.

The method as recited above implies that different acceleration values may be obtained for different values of the acceleration setting member. This in turn implies that, e.g. an operator of a propulsion unit may choose how quickly the actual speed value should approach the speed setpoint value. This will in turn present an operator or a control system with an increased versatility with respect to the control of the propulsion unit.

As used herein, the term "acceleration setting member" relates to an entity that can be used by the acceleration value determination procedure. Purely by way of example, the "acceleration setting member" may be a numeric value, such as an integer or a real number. However, it is also contemplated that different choices of the acceleration setting member may be expressed in other terms than numerical. As a non-limiting example, choices for the acceleration setting member may be "low", "medium" or "high"; "A", "B" or "C" or similar.

Optionally, the torque conversion operation comprises forming a torque request sum by multiplying the acceleration value by a moment of inertia value, indicative of a moment of inertia associated with the propulsion unit, and adding thereto a resistive torque value, indicative of a resistive torque associated with the propulsion unit.

Forming a torque request sum in accordance with the above implies that an appropriately accurate estimate of the torque request may be arrived at.

Optionally, the torque conversion operation further comprises adding a torque disturbance value, indicative of torque disturbance associated with the propulsion unit, to the torque request sum.

The addition of the torque disturbance value implies that the torque request sum, and possibly also the torque request, may include a torque term that is not immediately derivable when studying, e.g. the current state of the propulsion unit or the entity, such as a vehicle, powered by the propulsion unit.

Purely by way of example, the torque disturbance value may be related to one or more of the following:
- a trailer connected to a vehicle hosting the propulsion unit, wherein the trailer may have certain characteristics, such as a number of axles, tires, friction etcetera, which are not known when initiating the method;
- unmodeled disturbances such as power take off equipment, waves/propeller going in/out the water (for a seagoing vessel hosting the propulsion unit);
- a sudden energy consumption change, for instance, when the propulsion unit powers a generator;
- uncertainties in measurements: inclination, mass, torque, curvature, etcetera associated with a vehicle propelled by the propulsion unit, and
- uncertainties in parameters: inertia, air drag and rolling resistance coefficients, curvature resistance factor, etcetera, associated with a vehicle propelled by the propulsion unit.

Optionally, the torque disturbance value is determined using values determined for at least one previous time instant for each one of an actual torque value, indicative of an actual torque of the output shaft, the moment of inertia value, the resistive torque value, the torque disturbance value and an actual acceleration value, indicative of an actual acceleration of said output shaft.

Purely by way of example, each one of the actual torque value and the actual acceleration value can be determined by a sensor associated with the output shaft.

As may be realized from the above, the torque disturbance value may be determined using inter alia a torque disturbance value for at least one previous time instant. As such, though purely by way of example, the method may comprise setting the torque disturbance value to be a predetermined value, for instance, zero, at a certain time instant.

Purely by way of example, the method may comprise setting the torque disturbance value to be zero when the propulsion unit is started.

Determining the torque disturbance value using the above values implies an appropriately accurate estimate of the torque disturbance.

Optionally, the method further comprises using the torque request sum as the torque request value.

Optionally, the propulsion unit is connected to a drivetrain for propelling a vehicle and each one of the moment of inertia value and resistive torque value is determined on the basis of information indicative of at least a current operating condition of the drivetrain. Such a determination implies that current operating conditions, such as a current speed ratio between the propulsion unit and, e.g. ground engaging members such as wheels, are duly accounted for. Purely by way of example, the information indicative of at least a current operating condition of the drivetrain may comprise information indicative of, e.g. a road inclination, viz., the inclination of the road on which the vehicle is travelling, vehicle acceleration and wheel speeds.

Optionally, the acceleration setting member, being used by the acceleration conversion function, may be selected from a predetermined set of acceleration setting members, the set comprising at least two different acceleration setting members, preferably the set comprising a continuous range of values for the acceleration setting member. This implies that a user or another system may select an appropriate acceleration setting member and thus arrive at an appropriate resulting value which may be used for arriving at an appropriate acceleration value.

Optionally, the method comprises selecting an acceleration setting member to be used by the acceleration conversion function.

Optionally, wherein the acceleration value determination procedure further comprises determining an overshoot prediction value for the acceleration value and if the absolute value of the resulting value exceeds the absolute value of the overshoot prediction value, the acceleration value determination procedure sets the acceleration value to equal the overshoot prediction value, otherwise, the acceleration value determination procedure sets the acceleration value to equal the resulting value.

The overshoot prediction value implies that the acceleration value may be kept within a reasonable range such that undesirably large acceleration amplitudes are avoided.

Optionally, the overshoot prediction value is determined using values determined for at least one previous time instant for each one of the speed setpoint value, the actual speed value, an actual torque value, indicative of an actual torque of the output shaft, the moment of inertia value, the resistive torque value and the torque disturbance value.

As such, the second aspect of the present invention relates to a control unit for controlling a rotational speed of an output shaft of a propulsion unit. The control unit is adapted to:

receive information relating to a speed setpoint value, indicative of a rotational speed setpoint for the output shaft, and an actual speed value, indicative of an actual rotational speed of the output shaft, receive information relating to an acceleration setting member, determine an acceleration value using an acceleration value determination procedure comprising employing an acceleration conversion function that uses the speed setpoint value, the actual speed value and the acceleration setting member as inputs and which produces a resulting value to be used for determining the acceleration value, the acceleration conversion function being such that different resulting values can be obtained for the same set of the speed setpoint value and the actual speed value but for different choices of the acceleration setting member, determine a torque request value using a torque conversion operation that uses the acceleration value, and issue a signal indicative of the torque request value to the propulsion unit.

Optionally, the torque conversion operation comprises forming a torque request sum by multiplying the acceleration value by a moment of inertia value, indicative of a moment of inertia associated with the propulsion unit, and adding thereto a resistive torque value, indicative of a resistive torque associated with the propulsion unit.

Optionally, the torque conversion operation further comprises adding a torque disturbance value, indicative of torque disturbance associated with the propulsion unit, to the torque request sum.

Optionally, the torque disturbance value is determined using values determined for at least one previous time instant for each one of an actual torque value, indicative of an actual torque of the output shaft, the moment of inertia value, the resistive torque value, the torque disturbance value and an actual acceleration value, indicative of an actual acceleration of said output shaft.

As may be realized from the above, the torque disturbance value may be determined using inter alia a torque disturbance value for at least one previous time instant. As such, though purely by way of example, the method may comprise setting the torque disturbance value to be a predetermined value, for instance, zero, at a certain time instant.

Purely by way of example, the method may comprise setting the torque disturbance value to be zero when the propulsion unit is started.

Optionally, the control unit is adapted to use the torque request sum as the torque request value.

Optionally, the propulsion unit is connected to a drivetrain for propelling a vehicle and each one of the moment of inertia value and resistive torque value is determined on the basis of information indicative of at least a current operating condition of the drivetrain.

Optionally, the acceleration setting member, being used by the acceleration conversion function, is from a predetermined set of acceleration setting members, the set comprising at least two different acceleration setting members, preferably the set comprising a continuous range of values for the acceleration setting member.

Optionally, the acceleration value determination procedure further comprises determining an overshoot prediction value for the acceleration value and if the absolute value of the resulting value exceeds the absolute value of the overshoot prediction value, the acceleration value determination procedure sets the acceleration value to equal the overshoot prediction value, otherwise, the acceleration value determination procedure sets the acceleration value to equal the resulting value.

Optionally, the overshoot prediction value is determined using values determined for at least one previous time instant for each one of the speed setpoint value, the actual speed value, an actual torque value, indicative of an actual torque of the output shaft, the moment of inertia value, the resistive torque value and the torque disturbance value.

A third aspect of the invention relates to a propulsion assembly comprising a propulsion unit and a control unit according to the second aspect of the present invention.

Optionally, the propulsion assembly further comprises an acceleration setting arrangement adapted to receive a signal indicative of a selected acceleration setting and in response thereto issue the signal indicative of the acceleration setting member to the control unit.

A fourth aspect of the invention relates to a vehicle comprising a control unit according to the second aspect of the invention or a propulsion assembly according to the third aspect of the present invention.

Optionally, the vehicle comprises a drivetrain for propelling the vehicle, the propulsion unit being connected to the drivetrain.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

The invention will be described below for a vehicle in the form of a truck 10 such as the truck illustrated in FIG. 1. The truck 10 should be seen as an example of a vehicle which could comprise a control unit according to the present invention.

However, the present invention may be implemented in a plurality of different types of vehicles. Purely by way of example, the present invention could be implemented in a truck, a tractor, a car, a bus, a work machine, such as a wheel loader or any other type of construction equipment. Moreover, the present invention need not be implanted in a vehicle, but may be used for a stationary propulsion unit, such as a power generator (not shown).

Figure 1:
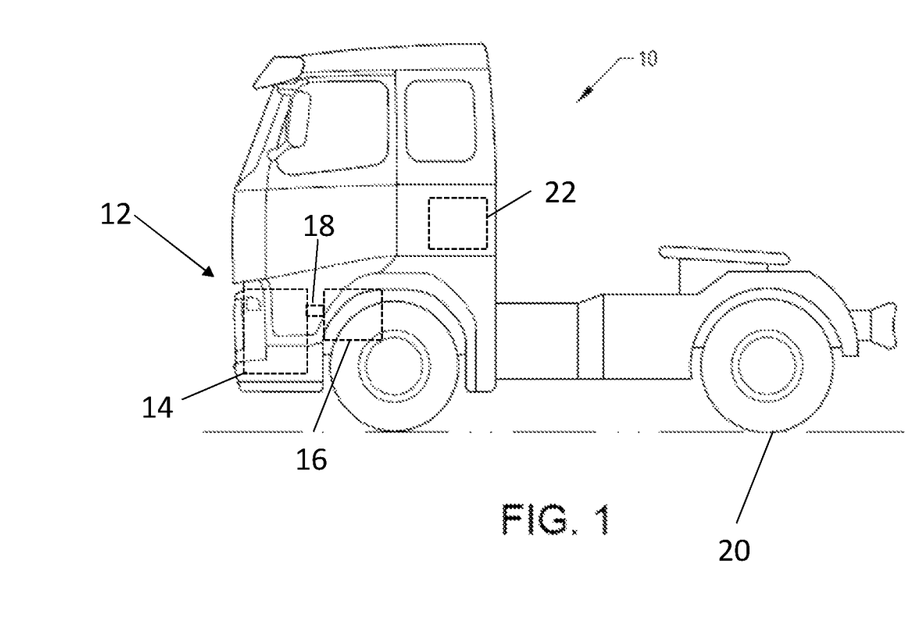
FIG. 1 is a schematic view of a vehicle.

The FIG. 1 vehicle comprises a powertrain 12 that in turn comprises a propulsion unit 14 and a drivetrain 16. Purely by way of example, the propulsion unit 14 may comprise or constitute an internal combustion engine and the drivetrain 16 may comprise a transmission assembly, such as a gearbox. Moreover, as indicated in FIG. 1, the propulsion unit 14 comprises an output shaft 18. In the FIG. 1 embodiment, the output shaft 18 is connected to the drivetrain 16.

Purely by way of example, the drivetrain 16 may be adapted to assume a plurality of different conditions with different speed ratios between the propulsion unit 14 and driving wheels 20 of the vehicle 10. As a non-limiting example, the drivetrain 16 may comprise a stepped transmission assembly with a fixed set of speed ratios between the propulsion unit 14 and driving wheels 20 of the vehicle 10. Alternatively, the drivetrain 16 may comprise a stepless transmission assembly via which an infinite number of speed ratios may be obtained between the propulsion unit 14 and driving wheels 20 of the vehicle 10.

FIG. 1 further illustrates that the vehicle 10 may comprise a control unit 22 as will be presented further hereinbelow. The propulsion unit 14 and the control unit 22 may be regarded as forming part of a propulsion assembly.

Figure 2:
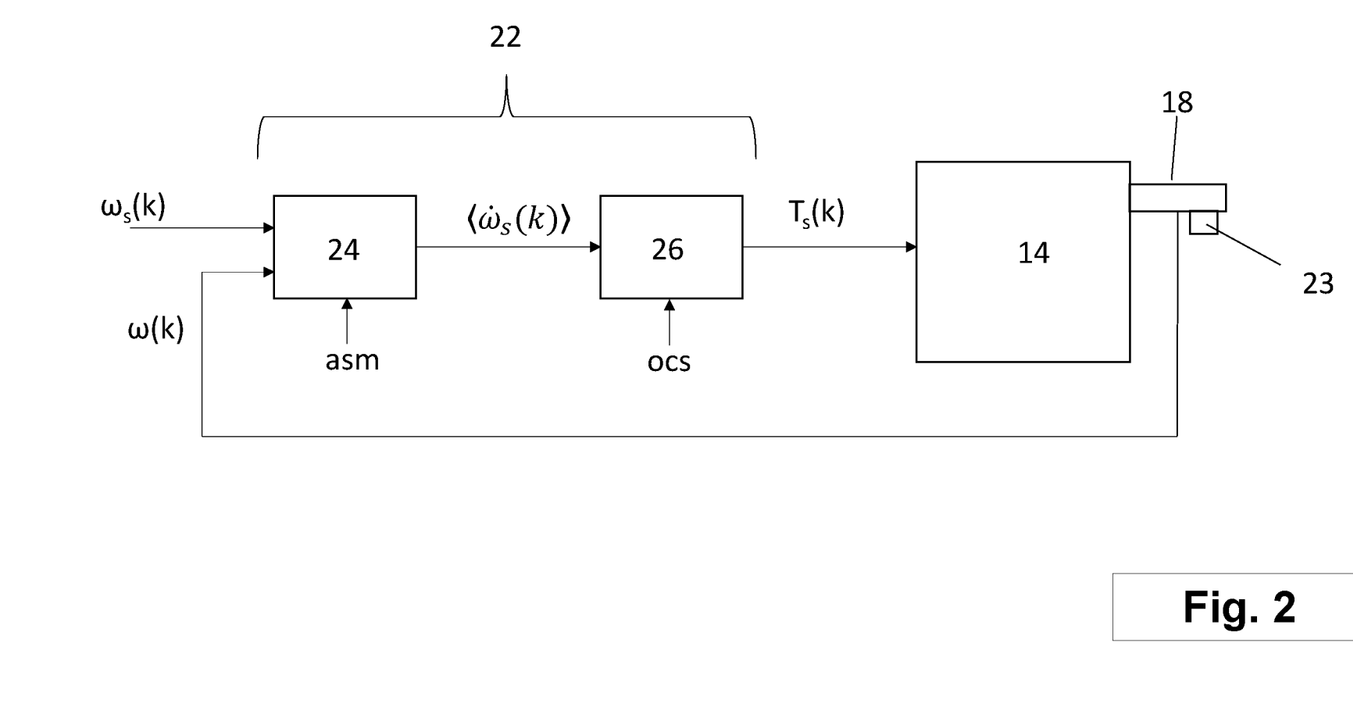
FIG. 2 illustrates a block diagram of an embodiment of a control unit in accordance with the present invention.

FIG. 2 schematically illustrates a block diagram of an embodiment of a control unit 22 in accordance with the present invention. Although details of the present invention will be presented in relation to the control unit 22, it should be noted that the below presentation is equally applicable to other aspects of the present invention. In particular, the below presentation with reference to the control unit 22 is equally applicable to the first aspect of the present invention, viz., the method for controlling a rotational speed of an output shaft 18 of a propulsion unit 14.

The FIG. 2 control unit 22 is adapted to control a rotational speed of an output shaft 18 of a propulsion unit 14.

The control unit 22 is adapted to receive information relating to a speed setpoint value $\omega_s(k)$, indicative of a rotational speed setpoint for the output shaft 18, and an actual speed value $\omega(k)$, indicative of an actual rotational speed of the output shaft 18. Here, the parameter k may either be a real number (for instance, indicating an actual time instant) or an integer indicating a reference index for a certain time instant such that two adjacent values of the parameter k, such as k−1 and k, indicate adjacent occurrences in time. Purely by way of example, the temporal distance between two adjacent parameter values, such as k−1 and k, may be a predetermined time increment. As another non-limiting example, an as will be exemplified hereinbelow, the parameter k may be related to certain conditions in an internal combustion engine. Consequently, the temporal distance between two adjacent values of the parameter k may be dependent on the current operating condition of the propulsion unit. In the below description, k is used as an integer.

The FIG. 2 embodiment of the control unit 22 comprises an acceleration controller 24 adapted to receive the above two values $\omega_s(k)$, $\omega(k)$. Moreover, the control unit 22 is adapted to receive information relating to an acceleration setting member asm. In the FIG. 2 embodiment, the acceleration controller 24 is adapted to receive information relating to an acceleration setting member asm.

Furthermore, the control unit 22 is adapted to determine an acceleration value $<\dot{\omega}_s(k)>$ using an acceleration value determination procedure comprising employing an acceleration conversion function that uses the speed setpoint value $\omega_s(k)$, the actual speed value $\omega(k)$ and the acceleration setting member asm as inputs and which produces a resulting value $\dot{\omega}_s(k)$ to be used for determining the acceleration value acceleration value $<\dot{\omega}_s(k)>$. The acceleration conversion function is such that different resulting values $\dot{\omega}_s(k)$ can be obtained for the same set of the speed setpoint value $\omega_s(k)$ and the actual speed value $\omega(k)$ but for different choices of the acceleration setting member asm. The relation between the resulting value $\dot{\omega}_s(k)$ and the acceleration value acceleration value $<\dot{\omega}_s(k)>$ will be presented hereinbelow with reference to FIG. 3.

Additionally, the control unit 22 is adapted to determine a torque request value $T_s(k)$ using a torque conversion operation that uses the acceleration value $<\dot{\omega}_s(k)>$ and to issue a signal indicative of the torque request value $T_s(k)$ to the propulsion unit 14.

The FIG. 2 embodiment of the control unit 22 comprises a torque controller 26 adapted to issue the signal indicative of the torque request value $T_s(k)$ to the propulsion unit 14 using the acceleration value $<\dot{\omega}_s(k)>$.

Figure 3:
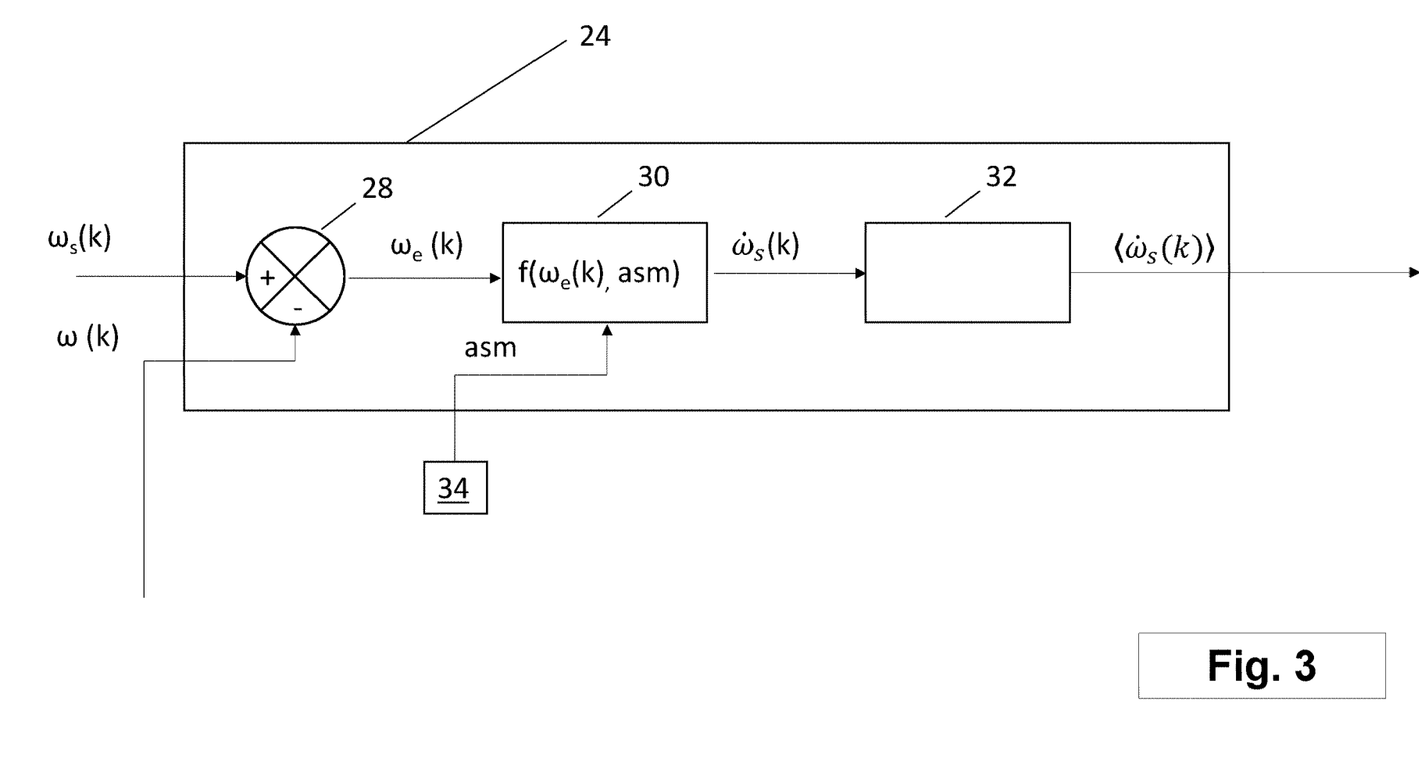
FIG. 3 illustrates a block diagram of implementation of a portion of a control unit.

Non-limiting examples of how the acceleration value acceleration value $<\dot{\omega}_s(k)>$ can be determined are presented hereinbelow. As such, FIG. 3 illustrates an example implementation of the acceleration controller 24 introduced in relation to FIG. 2. The FIG. 3 implementation of the acceleration controller 24 comprises a summing point 28, an acceleration converter 30 and an overshoot predictor 32.

Purely by way of example, and as indicated in FIG. 3, the propulsion assembly—which has been introduced hereinabove and which comprises the propulsion unit 14 and the control unit 22—may further comprise an acceleration setting arrangement 34 adapted to receive a signal indicative of a selected acceleration setting and in response thereto issue the signal indicative of the acceleration setting member asm to the control unit.

As a non-limiting example, such an acceleration setting arrangement 34 may comprise a human-machine interface such as a lever, knob, touch screen or the like, via which an operator may select a preferred acceleration setting member asm. Alternatively, the acceleration setting arrangement 34 may be adapted so as to automatically set the acceleration setting member asm.

As a non-limiting example, the acceleration setting member is from a predetermined set of acceleration setting members, the set comprising at least two different acceleration setting members. Preferably the set comprising a continuous range of values for the acceleration setting member. As another non-limiting example, the set of acceleration setting members may comprise a limited set of values which may, for instance, be selected from a look-up table or the like.

As indicated in FIG. 3, the summing point 28 calculates the difference between the speed setpoint value $\omega_s(k)$ and the actual speed value $\omega(k)$ and the result of the difference is a speed error $\omega_e(k)$ as presented hereinbelow:

$$\omega_e(k)=\omega_s(k)-\omega(k) \quad \text{Eq. 1}$$

Once the speed error $\omega_e(k)$ has been determined, an acceleration converter 30 determines a resulting value $\dot{\omega}_s(k)$ from the speed error $\omega_e(k)$. Purely by way of example, and as indicated in FIG. 3, the acceleration converter 30 may operate in accordance with the following:

$$\dot{\omega}_e(k)=f(\omega_e(k),\text{asm}) \quad \text{Eq. 2}$$

wherein $f(\dot{\omega}_e(k), \text{asm})$ is an acceleration conversion function that can calculate the resulting value $\dot{\omega}_s(k)$ using the speed error $\omega_e(k)$ and the acceleration setting member asm as parameters.

As a non-limiting example, the acceleration conversion function can be in accordance with the following:

$$f(\omega_e(k),\text{asm})=\omega_e(k)\cdot \text{asm} \quad \text{Eq. 3}$$

such that the resulting value $\dot{\omega}_s(k)$ may be linearly dependent on the acceleration setting member asm. However, other functions are also conceivable, such as $\dot{\omega}_s(k)$, may be dependent on the square of the acceleration setting member asm or the like.

Moreover, in embodiments of the control unit 22, the speed error $\omega_e(k)$ need not be explicitly determined. Instead, the acceleration conversion function can be in accordance with the following example:

$$\dot{\omega}_e(k)=f(\omega_s(k),\omega(k),\text{asm}) \quad \text{Eq. 4}$$

As such, the function $f$ in Eq. 4 hereinabove need not necessarily determine the difference between the speed setpoint value $\omega_s(k)$ and the actual speed value $\omega(k)$. Purely by way of example, the function $f$ in Eq. 4 may refer to a table, such as a look-up table from which resulting values $\dot{\omega}_s(k)$ can be looked up and/or interpolated using the speed setpoint value $\omega_s(k)$, the actual speed value $\omega(k)$ and the acceleration setting member asm.

Irrespective of how the resulting value $\dot{\omega}_s(k)$ is determined, it is used for determining the acceleration value acceleration value $<\dot{\omega}_s(k)>$. As a non-limiting example, the acceleration value $<\dot{\omega}_s(k)>$ can be set to equal the resulting value $\dot{\omega}_s(k)$.

However, the acceleration value determination procedure may further comprise determining an overshoot prediction value for the acceleration value and if the absolute value of the resulting value exceeds the absolute value of the overshoot prediction value, the acceleration value determination procedure sets the acceleration value to equal the overshoot prediction value. Otherwise, the acceleration value determination procedure sets the acceleration value to equal the resulting value. The above possibility is exemplified by the overshoot predictor 32 in FIG. 3 although the feature of determining an overshoot prediction value may be implemented in a plurality of different ways.

Irrespective of the implementation of how the overshoot prediction value is determined, the overshoot prediction value may use values determined for at least one previous time instant for each one of the speed setpoint value $\omega_s(k)$, the actual speed value $\omega(k)$, an actual torque value, indicative of an actual torque of the output shaft 18, a moment of inertia value, a resistive torque value and a torque disturbance value. The entities relating to each one of: the actual torque value, the moment of inertia value, the resistive torque value and the torque disturbance value will be presented hereinbelow.

Turning to the torque conversion operation, such a conversion may, for instance, be performed by the torque controller 26 in FIG. 2.

Purely by way of example, the torque conversion operation may comprise forming a torque request sum by multiplying the acceleration value by a moment of inertia value, indicative of a moment of inertia associated with the propulsion unit, and adding thereto a resistive torque value, indicative of a resistive torque associated with the propulsion unit.

Preferably, though purely by way of example, the control unit 22 may be adapted to use the torque request sum as the torque request value.

The forming of the torque request sum in accordance with the above is exemplified hereinbelow.

$$T(k)=\hat{J}(k)\cdot<\dot{\omega}_s(k)>+\hat{T}_r(k) \quad \text{Eq. 5}$$

where:
$T(k)$ is the torque request sum;
$\hat{J}(k)$ is the moment of inertia value; $<\dot{\omega}_s>$ is the acceleration value, and
$\hat{T}_r(k)$ is the resistive torque.

The torque request sum $T(k)$ may be modified further, e.g., by putting overshoot or undershoot constraints thereon, before forming the torque request value $T_s(k)$. However, it is envisaged that the torque request value $T_s(k)$ may be set so as to equal the torque request sum $T(k)$.

In embodiments of the control unit 22, the torque conversion operation may further comprise adding a torque disturbance value, indicative of torque disturbance associated with the propulsion unit, to the torque request sum. As such, Eq. 5 may be expanded in accordance with the following:

$$T(k)=\hat{J}(k)\cdot\langle\dot{\omega}_s(k)\rangle+\hat{T}_r(k)+\hat{T}_d(k) \quad \text{Eq. 6}$$

where:

$\hat{T}_d(k)$ is the torque disturbance value.

As a non-limiting example, the torque disturbance value $\hat{T}_d(k)$ may be determined using values determined for at least one previous time instant for each one of an actual torque value $T_a(k-1)$, the moment of inertia value $\hat{J}(k-1)$, the resistive torque value $\hat{T}_r(k-1)$, the torque disturbance value $\hat{T}_d(k-1)$ and an actual acceleration value $\dot{\omega}(k)$.

Since a previous value $\hat{T}_d(k-1)$ of the torque disturbance value is used when determining the torque disturbance value $\hat{T}_d(k)$, the torque disturbance value $\hat{T}_d(k-1)$ for at least one previous time instant k−1 may be set to zero when starting the procedure for determining the torque disturbance value $\hat{T}_d(k)$. Purely by way of example, the torque disturbance value may be set to zero for k=1 and possibly also for k=2, for instance when starting the propulsion unit 14.

As has been indicated hereinabove with reference to FIG. 1, the propulsion unit 14 may be connected to a drivetrain 16 for propelling a vehicle 10. Moreover, each one of the moment of inertia value $\hat{J}(k)$ and resistive torque value $\hat{T}_r(k)$ may be determined on the basis of information indicative of at least a current operating condition of the drivetrain 16.

To this end, though purely by way of example, reference is made to FIG. 2 again in which it is indicated that the torque controller 26 may receive a signal ocs indicative of a current operating condition of the drivetrain 16. As a non-limiting example, the signal ocs indicative of the current operating condition of the drivetrain 16 may comprise, or even consist of, information indicative of a current speed ratio, e.g., between the propulsion unit 14 and driving wheels 20 of the vehicle 10 as mentioned hereinabove. To this end, it should be noted that, e.g., the moment of inertia value $\hat{J}(k)$ may be dependent on the current speed ratio.

Moreover, it should be noted that each one of the moment of inertia value $\hat{J}(k)$ and resistive torque value $\hat{T}_r(k)$ may be dependent on additional parameters. As such, in embodiments of the present invention wherein the control unit 22 is adapted to control a propulsion unit for propelling a vehicle, such additional parameters may, for instance, comprise information such as road inclination, viz., the inclination of the road on which the vehicle is travelling, vehicle acceleration and wheel speeds. As such, the signal ocs indicative of the current operating condition of the drivetrain 16 may comprise information indicative of the conditions of a vehicle that the propulsion unit 14 is propelling.

Furthermore, the ocs may comprise information indicative of the, for instance, the actual torque $T_a(k)$ being produced by the propulsion unit 14. To this end, though purely by way of example, the powertrain 12 may comprise a sensor 23 adapted to determine information indicative of the current operating condition of the propulsion unit 14, such as the current operating condition of the drivetrain 16 and/or the actual torque $T_a(k)$. Purely by way of example, such a sensor 23 may be adapted to be in communication with one or more portions of the control unit, such as the torque controller 26, such that information determined by the sensor 23 may be forwarded to the relevant portions of the control unit 22.

Although the above presentation of the invention is applicable for any type of propulsion unit 14, for instance be it an internal combustion engine or an electric machine or a combination thereof, certain implementations for an internal combustion engine will be presented hereinbelow. In particular the below examples are presented in relation to a six-cylinder internal combustion engine, such as a six-cylinder diesel engine.

Figure 4:
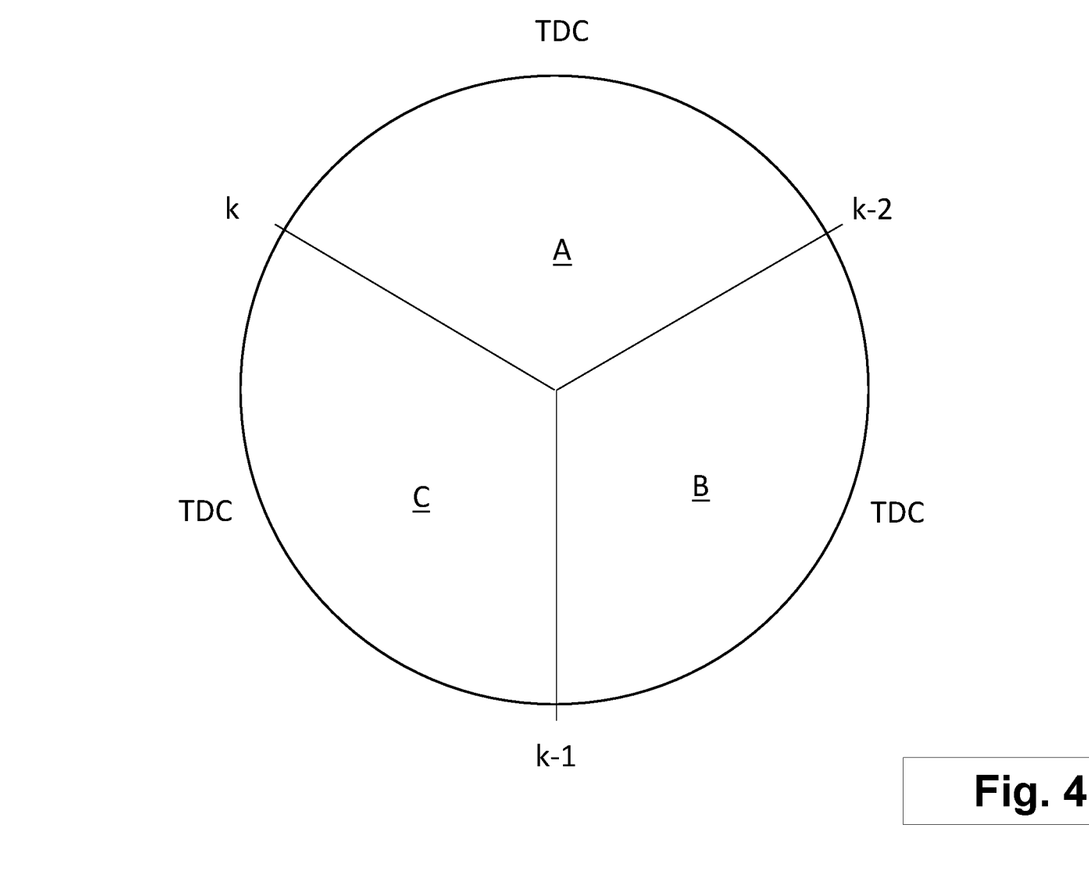
FIG. 4 schematically illustrates injection cycles for an internal combustion engine.

FIG. 4 illustrates a combustion cycle for three cylinders of a six-cylinder engine. In particular, FIG. 4 illustrates an injection cycle A, B, C for each one of the three cylinders. The injection cycle for each of the other three cylinders of the six-cylinder engine may be synchronized with the three cylinders indicated in FIG. 4 such that each one of the injection cycles A, B, C illustrates the injection cycle for a pair of cylinders of the engine.

Each cylinder comprises a piston adapted for reciprocal movement in the cylinder between a bottom dead centre and top dead centre. The top dead centre TDC for each injection cycle A, B, C is indicated in FIG. 4.

As may be gleaned from FIG. 4, a crank angle range of approximately 60° is available for each injection cycle A, B, C during which the torque produced by the stroke of the relevant cylinder can be controlled. As such, using injection cycle A as an example, control of the produced torque may occur between the time instant indicated by k and the time instant indicated by TDC for injection cycle A. Moreover, as will be elaborated on hereinbelow, certain entities used when determining, e.g., the torque request sum T(k) may be based on data representing a previous time instant. As has been indicated hereinabove, each time instant k−1, k, k+1 etcetera, may be related to a certain crank angle position of the internal combustion engine.

Purely by way of example, and has been indicated hereinabove, the torque disturbance value $\hat{T}_d(k)$ may be determined for a previous time instant for each one of an actual torque value $T_a(k-1)$, the moment of inertia value $\hat{J}(k-1)$, the resistive torque value $\hat{T}_r(k-1)$, the torque disturbance value $\hat{T}_d(k-1)$ and an actual acceleration value $\dot{\omega}(k)$.

For an internal combustion engine, in particular with a six-cylinder internal combustion engine, the torque disturbance value $\hat{T}_d(k)$ may be determined in accordance with the following:

$$\hat{T}_d(k)=\hat{J}(k)\cdot(\hat{\dot{\omega}}(k)-\dot{\omega}(k))\cdot\alpha+\hat{T}_d(k-1) \quad \text{Eq. 7}$$

wherein $\hat{\dot{\omega}}(k)$ represents an expected cylinder acceleration in the last injection cycle, starting at k−1 and ending at k, and can be determined as follows:

$$\hat{\dot{\omega}}(k) = \frac{T_a(k-1) - \hat{T}_r(k-1) - \hat{T}_d(k-1)}{\hat{J}(k-1)} \quad \text{Eq. 8}$$

Moreover, $\dot{\omega}(k)$ represents an actual acceleration value at the end of the last injection cycle, starting at k−1 and ending at k. As a non-limiting example, the actual acceleration value $\dot{\omega}(k)$ may be determined by determining the rotational speed of the output shaft 18, for instance, using the sensor 23 mentioned above, on a plurality of time instants, for instance, time instants between k−1 and k, and determining a mean acceleration value by calculating a derivative using the determined rotational speeds as well as information indicative of the time increment between the time instants.

It should not be overlooked that Eq. 7 contains a term a that is within the range of zero to one such that $0 \leq \alpha \leq 1$. The term a can be used for controlling how fast the torque disturbance is learnt by the control unit 22. Purely by way of example, the term a may improve robustness by avoiding the overcompensation when cylinders are unbalanced and the value of the term a may, for instance, be in the range of approximately 0.4. As a non-limiting example, a time dependent variant $\alpha'(k)$ of the term a may be used instead of the term a in Eq. 7, which time dependent variant may be determined in accordance with the following:

$$\alpha'(k) = \frac{\alpha}{\omega(k-1) \cdot \frac{m}{60} \cdot \delta t} \quad \text{Eq. 9}$$

wherein $\delta t$ is a time stamp and the parameter m (which generally is an integer) corresponds to the number of strokes per revolution. As a non-limiting example, the time stamp $\delta t$ may be selected so as to be smaller than the time increment between two adjacent time instants, e.g. k−1 and k. Purely by way of example, the time stamp $\delta t$ may be less than 50%, preferably less than 30%, more preferred less than 10%, of the time increment between two adjacent time instants, e.g. k−1 and k.

Purely by way of example, for an internal combustion engine with six cylinders operating in pairs, the integer m may be set to three. For the sake of completeness, it should be noted that the term $\omega(k-1)$ can be expressed as a rotational speed measurement in rpm.

Presented hereinbelow is an example of how the overshoot prediction value, as has been introduced above, may be determined for an internal combustion engine.

The overshot prediction value determination procedure presented hereinbelow is based on the assumption that the acceleration value to be used when determining the torque request value should not exceed the maximum acceleration that the internal combustion engine could achieve during a predetermined number n of strokes. Furthermore, the maximum achievable acceleration during the predetermined number n of strokes may be based using information from two preceding time instants k−1 and k−2. To this end, though purely by way of example, an overshoot prediction value $\dot\omega_l(k)$ may be determined in accordance with the following:

$$\dot\omega_l(k) = \frac{\omega_s^2(k-1) - \omega^2(k-1)}{2 \cdot \frac{2\pi}{m} \cdot n} - \frac{T_a(k-1) - \hat{T}_r(k-2) - \hat{T}_d(k-2)}{\hat{J}(k-2)} \quad \text{Eq. 10}$$

wherein m is the number of strokes per revolution and n corresponds to the number of revolutions in which the engine should achieve the acceleration.

The overshoot prediction value $\dot\omega_l(k)$, as well as the resulting value $\dot\omega_s(k)$ discussed hereinabove, could be used for determining the acceleration value $<\dot\omega_s(k)>$ in accordance with the following:

$$\dot\omega_{upper}(k) = \max(\dot\omega_l(k), 0) \quad \text{Eq. 11}$$

$$\dot\omega_{lower}(k) = \min(\dot\omega_l(k), 0) \quad \text{Eq. 12}$$

$$<\dot\omega_s(k)> = \max(\min(\dot\omega_s(k), \dot\omega_{upper}(k)), \dot\omega_{lower}(k)) \quad \text{Eq. 13}$$

The use of an upper limit $\dot\omega_{upper}(k)$ and a lower limit $\dot\omega_{lower}(k)$ for the overshoot prediction value $\dot\omega_l(k)$ in the above equations is occasioned by the fact that the overshoot prediction value $\dot\omega_l(k)$, as well as the resulting value $\dot\omega_s(k)$, may be positive as well as negative.

It should be noted that the although the above equations Eq. 7-Eq. 13 have been presented in relation to an internal combustion engine, the equations could also be adapted so as to be applicable for an electric motor.

Figure 5:
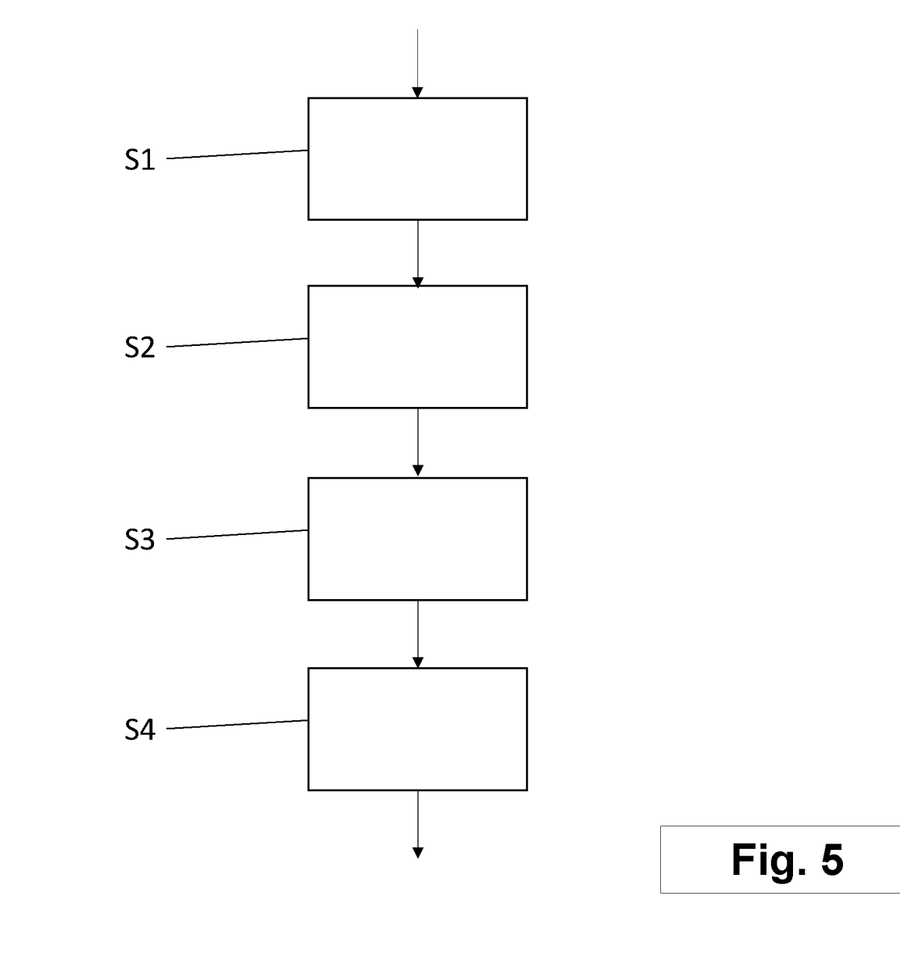
FIG. 5 is a flow chart illustrating an embodiment of the method of the present invention.

FIG. 5 is a flow chart illustrating a method for controlling a rotational speed w of an output shaft 18 of a propulsion unit 14. The method comprises:

S1. determining a speed setpoint value $(\omega_s(k))$, indicative of a rotational speed setpoint for said output shaft (18), and an actual speed value $(\omega(k))$, indicative of an actual rotational speed of said output shaft (18), S2. determining an acceleration value $(<\dot\omega_s(k)>)$ using an acceleration value determination procedure comprising employing an acceleration conversion function $(f(\omega_s(k), \omega(k), \text{asm}))$ that uses said speed setpoint value $(\omega_s(k))$, said actual speed value $(\omega(k))$ and an acceleration setting member (asm) as inputs and which produces a resulting value $(\dot\omega_s(k))$ to be used for determining said acceleration value $(<\dot\omega_s(k)>)$, said acceleration conversion function $(f(\omega_s(k), \omega(k), \text{asm})$ being such that different resulting values $(\dot\omega_s(k))$ can be obtained for the same set of said speed setpoint value $(\omega_s(k))$ and said actual speed value $(\omega(k))$ but for different choices of said acceleration setting member (asm), S3. determining a torque request value using a torque conversion operation that uses said acceleration value $(<\dot\omega_s(k)>)$, and S4. controlling said propulsion unit (14) using said torque request value.

It is to be understood that the present invention is not limited to the embodiments described above and illustrated in the drawings; rather, the skilled person will recognize that many changes and modifications may be made within the scope of the appended claims.

The invention claimed is:

1. A method for controlling a rotational speed of an output shaft of a propulsion unit, said method comprising:
    determining a speed setpoint value, indicative of a rotational speed setpoint for said output shaft, and an actual speed value, indicative of an actual rotational speed of said output shaft,
    determining an acceleration value using an acceleration value determination procedure comprising employing an acceleration conversion function that uses said speed setpoint value, said actual speed value and an acceleration setting member as inputs and which produces a resulting value to be used for determining said acceleration value, said acceleration conversion function being such that different resulting values can be obtained for a same set of said speed setpoint value and said actual speed value but for different choices of said acceleration setting member,
    determining a torque request value using a torque conversion operation that uses said acceleration value, wherein said torque conversion operation comprises forming a torque request sum by multiplying said acceleration value by a moment of inertia value, indicative of a moment of inertia associated with said propulsion unit, and adding thereto a resistive torque value, indicative of a resistive torque associated with said propulsion unit and wherein said torque conversion operation further comprises adding a torque disturbance value, indicative of torque disturbance associated with said propulsion unit, to said torque request sum, wherein said torque disturbance value is determined using values determined for at least one previous time instant for each one of an actual torque value, indicative of an actual torque of said output shaft, said moment of inertia value, said resistive torque value, said torque disturbance value and an actual acceleration value, indicative of an actual acceleration of said output shaft, and controlling said propulsion unit using said torque request value.

2. The method according to claim 1, further comprising using said torque request sum as said torque request value.

3. The method according to claim 1, wherein said propulsion unit is connected to a drivetrain for propelling a vehicle and each one of said moment of inertia value and resistive torque value is determined on the basis of information indicative of at least a current operating condition of said drivetrain.

4. The method according to claim 1, wherein said acceleration setting member, being used by said acceleration conversion function, is from a predetermined set of acceleration setting members, said set comprising at least two different acceleration setting members.

5. The method according to claim 1, wherein said method comprises selecting an acceleration setting member to be used by said acceleration conversion function.

6. The method according to claim 1, wherein said acceleration value determination procedure further comprises determining an overshoot prediction value for said acceleration value and if the absolute value of said resulting value exceeds the absolute value of said overshoot prediction value, said acceleration value determination procedure sets said acceleration value to equal said overshoot prediction value, otherwise, said acceleration value determination procedure sets said acceleration value to equal said resulting value.

7. The method according to claim 6, wherein said overshoot prediction value is determined using values determined for at least one previous time instant for each one of said speed setpoint value, said actual speed value, an actual torque value, indicative of an actual torque of said output shaft, said moment of inertia value, said resistive torque value and said torque disturbance value.

8. A control unit for controlling a rotational speed of an output shaft of a propulsion unit, said control unit being adapted to:
receive information relating to a speed setpoint value, indicative of a rotational speed setpoint for said output shaft, and an actual speed value, indicative of an actual rotational speed of said output shaft,
receive information relating to an acceleration setting member,
determine an acceleration value using an acceleration value determination procedure comprising employing an acceleration conversion function that uses said speed setpoint value, said actual speed value and said acceleration setting member as inputs and which produces a resulting value to be used for determining said acceleration value, said acceleration conversion function being such that different resulting values can be obtained for a same set of said speed setpoint value and said actual speed value but for different choices of said acceleration setting member,
determine a torque request value using a torque conversion operation that uses said acceleration value, wherein said torque conversion operation comprises forming a torque request sum by multiplying said acceleration value by a moment of inertia value, indicative of a moment of inertia associated with said propulsion unit, and adding thereto a resistive torque value, indicative of a resistive torque associated with said propulsion unit and wherein said torque conversion operation further comprises adding a torque disturbance value, indicative of torque disturbance associated with said propulsion unit, to said torque request sum, wherein said torque disturbance value is determined using values determined for at least one previous time instant for each one of an actual torque value, indicative of an actual torque of said output shaft, said moment of inertia value, said resistive torque value, said torque disturbance value and an actual acceleration value, indicative of an actual acceleration of said output shaft and issue a signal indicative of said torque request value to said propulsion unit.

9. The control unit according to claim 8, wherein said control unit is adapted to use said torque request sum as said torque request value.

10. The control unit according to claim 8, wherein said propulsion unit is connected to a drivetrain for propelling a vehicle and each one of said moment of inertia value and resistive torque value is determined on the basis of information indicative of at least a current operating condition of said drivetrain.

11. The control unit according to claim 8, wherein said acceleration setting member, being used by said acceleration conversion function, is from a predetermined set of acceleration setting members, said set comprising at least two different acceleration setting members, preferably said set comprising a continuous range of values for said acceleration setting member.

12. The control unit according to claim 8, wherein said acceleration value determination procedure further comprising determining an overshoot prediction value for said acceleration value and if the absolute value of said resulting value exceeds the absolute value of said overshoot prediction value, said acceleration value determination procedure sets said acceleration value to equal said overshoot prediction value, otherwise, said acceleration value determination procedure sets said acceleration value to equal said resulting value.

13. The control unit according to claim 12, wherein said overshoot prediction value is determined using values determined for at least one previous time instant for each one of said speed setpoint value, said actual speed value, an actual torque value, indicative of an actual torque of said output shaft, said moment of inertia value, said resistive torque value and said torque disturbance value.

14. A propulsion assembly comprising a propulsion unit and a control unit according to claim 8.

15. The propulsion assembly according to claim 14, wherein said propulsion assembly further comprises an acceleration setting arrangement adapted to receive a signal indicative of a selected acceleration setting and in response thereto issue said signal indicative of said acceleration setting member to said control unit.

16. A vehicle comprising a propulsion assembly according to claim 14.

17. A vehicle comprising a control unit according to claim 8.

18. The vehicle according to claim 17, further comprising a drivetrain for propelling said vehicle, said propulsion unit being connected to said drivetrain.

* * * * *